March 4, 1969 T. W. NASH 3,430,794

FORKED COIL BUGGY

Filed Sept. 7, 1966 Sheet 1 of 5

INVENTOR.
Terry W. Nash

BY
Webb, Burden, Robinson & Webb

HIS ATTORNEYS

March 4, 1969 T. W. NASH 3,430,794

FORKED COIL BUGGY

Filed Sept. 7, 1966 Sheet 2 of 5

INVENTOR.
Terry W. Nash

BY
Webb, Burden, Robinson & Webb
HIS ATTORNEYS

INVENTOR.
Terry W. Nash
BY
Webb, Burden, Robinson & Webb
HIS ATTORNEYS

INVENTOR.
Terry W. Nash

BY
Webb, Burden, Robinson & Webb
HIS ATTORNEYS

INVENTOR.
Terry W. Nash
BY
[signature]
HIS ATTORNEYS

United States Patent Office 3,430,794
Patented Mar. 4, 1969

1

3,430,794
FORKED COIL BUGGY

Terry W. Nash, East Palestine, Ohio, assignor, by mesne assignments, to L. W. Nash Company, East Palestine, Ohio, a corporation of Delaware Filed Sept. 7, 1966, Ser. No. 577,711
U.S. Cl. 214—731 8 Claims
Int. Cl. B66f *9/14;* B65g *37/00, 67/00*

ABSTRACT OF THE DISCLOSURE

Coil handling apparatus including spaced ways and a horizontal base member cooperating with the ways for movement therealong and carrying a guide member on its upper surface. A vertically movable housing overlying said guide member, extensible fingers carried on opposite sides of said housing for movement with said housing and means for moving said housing relative to said guide member and said fingers relative to said housing.

This invention relates to apparatus for handling coils of strip material such as metal strip and more particularly to a device for moving coils from one position to another. Conventional coil handling apparatus consists of an overhead C-hook crane having a pair of fingers which extend into the center of the coil or a tractor mounted mandrel which is inserted into the center of the coil. The use of an overhead crane for moving coils requires considerable head room in the shop above the coil processing line or storage area and increases manpower needs. A tractor mounted mandrel is cumbersome and expensive and also requires extra manpower. Additionally, a sloping ramp is sometimes used for moving coils from one position to another. Rolling a coil down a ramp can cause extensive damage to the outer wrap of the coil. The use of a sloping ramp for moving coils has a number of drawbacks in that a heavy coil will have considerable momentum at the bottom of the ramp and is, therefore, difficult to control. Should a coil leave the ramp uncontrolled, damage to both the coil and adjacent equipment can result. Furthermore, a coil cannot be rolled down a ramp after a tail has been pulled on it.

My invention provides a novel device for moving coils and is capable of quickly lifting a coil and shifting it to another location without interfering with machinery adjacent to the coil. Due to the construction of my coil handling apparatus, it is possible to shift large heavy coils without damage to the coil wraps and to move coils having a tail without bending or twisting the tail during the move.

In the accompanying drawings I have shown a preferred embodiment of my invention in which.

Figures 1, 1A, 1B:
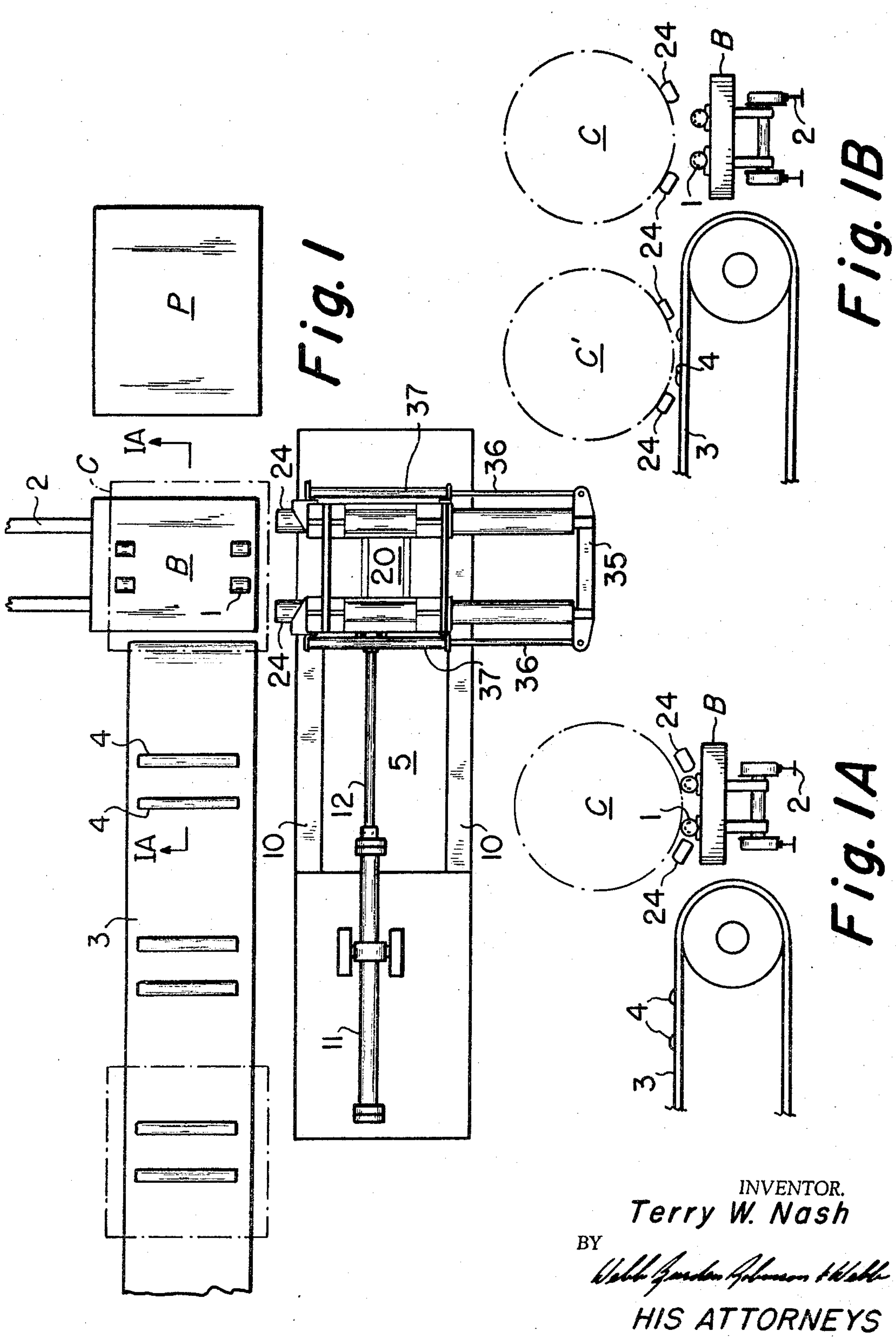
FIG. 1 is a plan view of a forked coil shifting buggy positioned to shift a coil from a buggy to a conveyer.
FIG. 1A is a section on line 1A—1A of FIG. 1 showing the lifting fingers beneath a coil.
FIG. 1B is a section on line 1A—1A of FIG. 1 showing a coil raised from the buggy and showing a coil over the conveyer in dotted lines.
Figure 2:
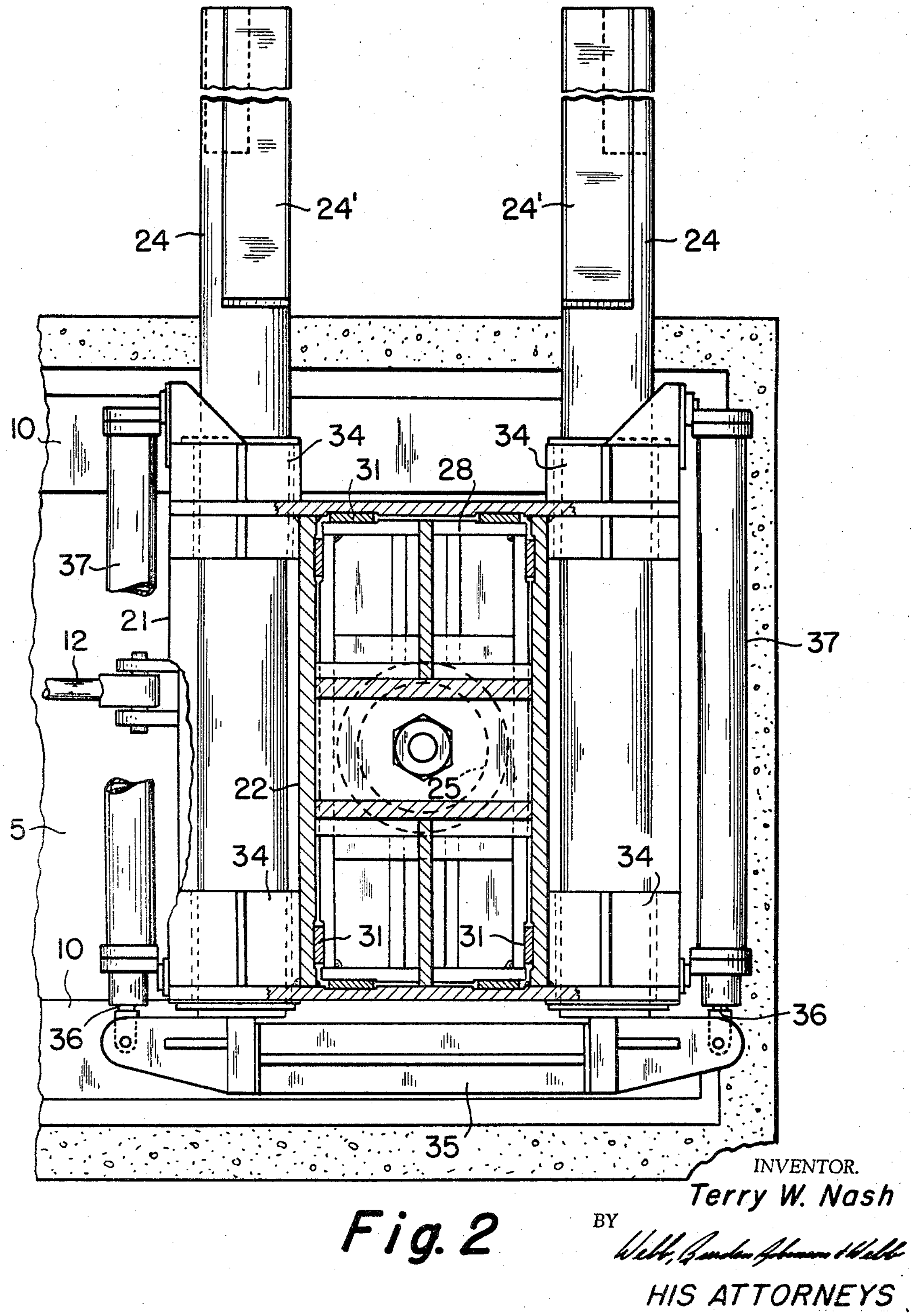
FIG. 2 is a plan view of the forked coil shifting buggy with portions broken away and portions in section.

Referring to FIG. 1 of the drawings, a coil C is shown resting on a standard coil buggy B located between a tail

2 puller P and a conveyer 3. The buggy B travels to and from the position shown in FIG. 1 on tracks 2 to locate the coil adjacent to tail puller P which pulls a tail on the coil to facilitate further processing of the coil. The buggy B is moved along the tracks by means of a hydraulic cylinder, hydraulic or electric motor, not shown. When buggy B is located at its coil receiving position, not shown, a coil is placed on it by means of an overhead crane or a coiling mandrel. The buggy is then moved to the position shown in FIG. 1, and a tail is pulled on the coil by the tail puller. After the tail has been pulled on the coil, it is necessary to move it from buggy B onto conveyer 3 for transportation to another work station or to a storage area. Conveyor 3 carries a plurality of pairs of spaced pallets 4 which support coils on the conveyer for movement to the desired location. The buggy B, tail puller P and conveyer form no part of my invention and, hence, are neither shown nor described in detail herein.

The forked coil shifting buggy 20 of my invention lifts a coil C from buggy B and transfers it to a pair of spaced pallets 4 on conveyer 3. The coil shifting buggy moves in a direction parallel to the direction of movement of the conveyer 3 along ways 10 which are shown in FIG. 1 as being located in a pit 5 in the concrete floor of the plant. The buggy 20 is moved along the ways by means of a hydraulic cylinder 11 and piston rod 12 which is attached to the base of the buggy. The hydraulic cylinder is also located in pit 5, and both the cylinder and the ways are attached to the floor of the pit to provide a rigid support for the coil shifting buggy and the power member.

Figure 3:
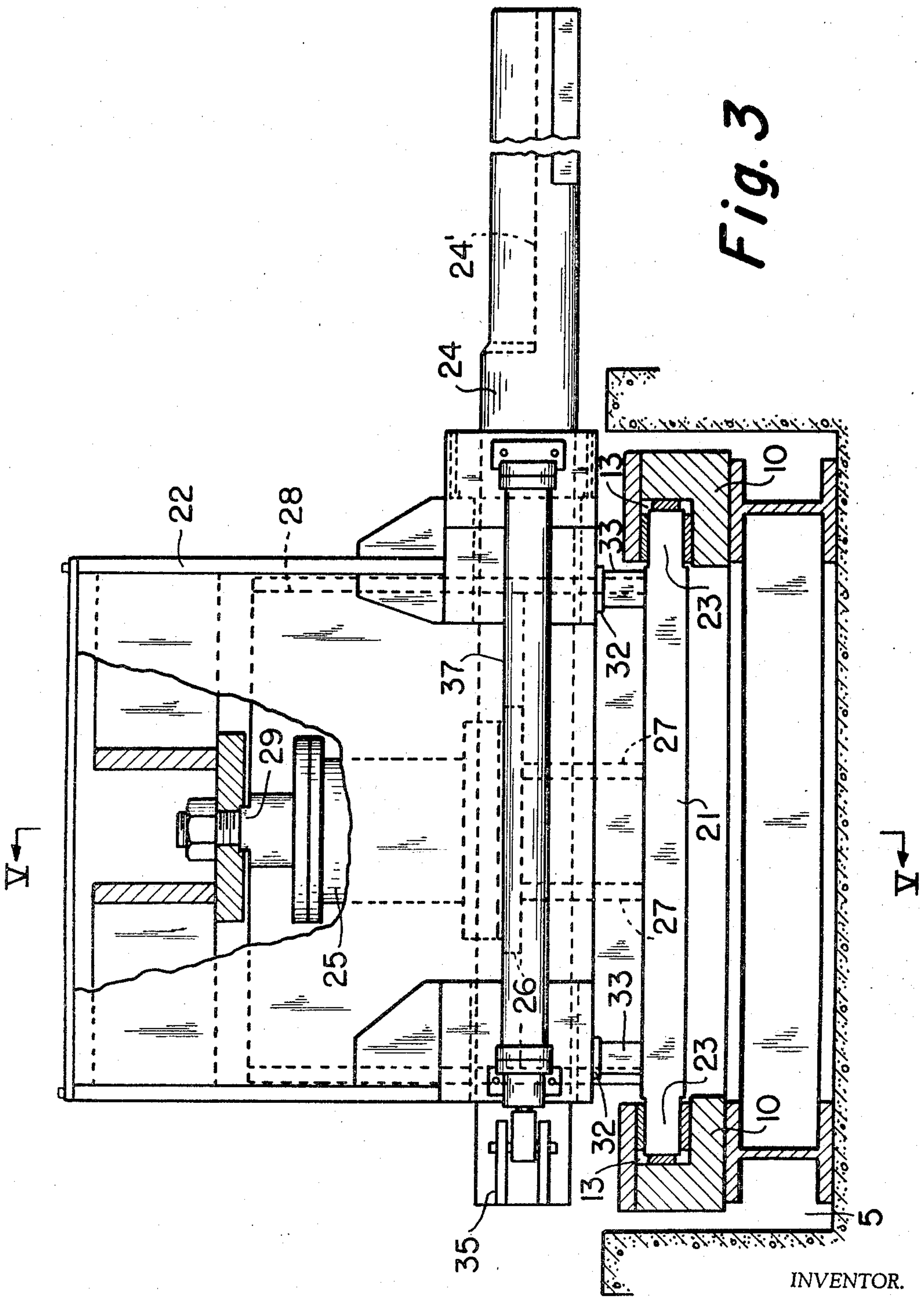
FIG. 3 is a side elevational view of the forked coil shifting buggy with portions broken away and portions in section.
Figure 4:
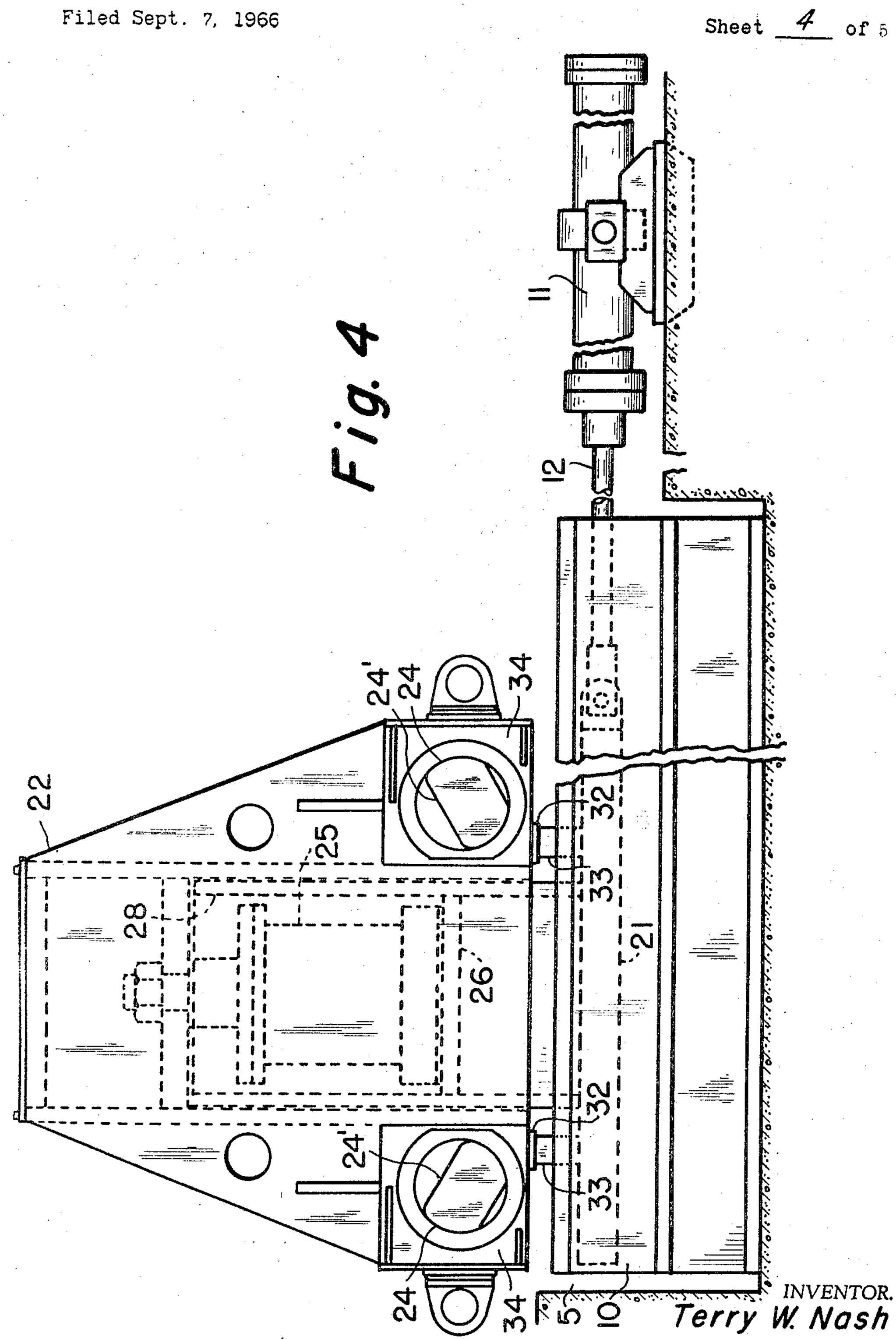
FIG. 4 is a front elevational view of the forked coil shifting buggy.
Figure 5:
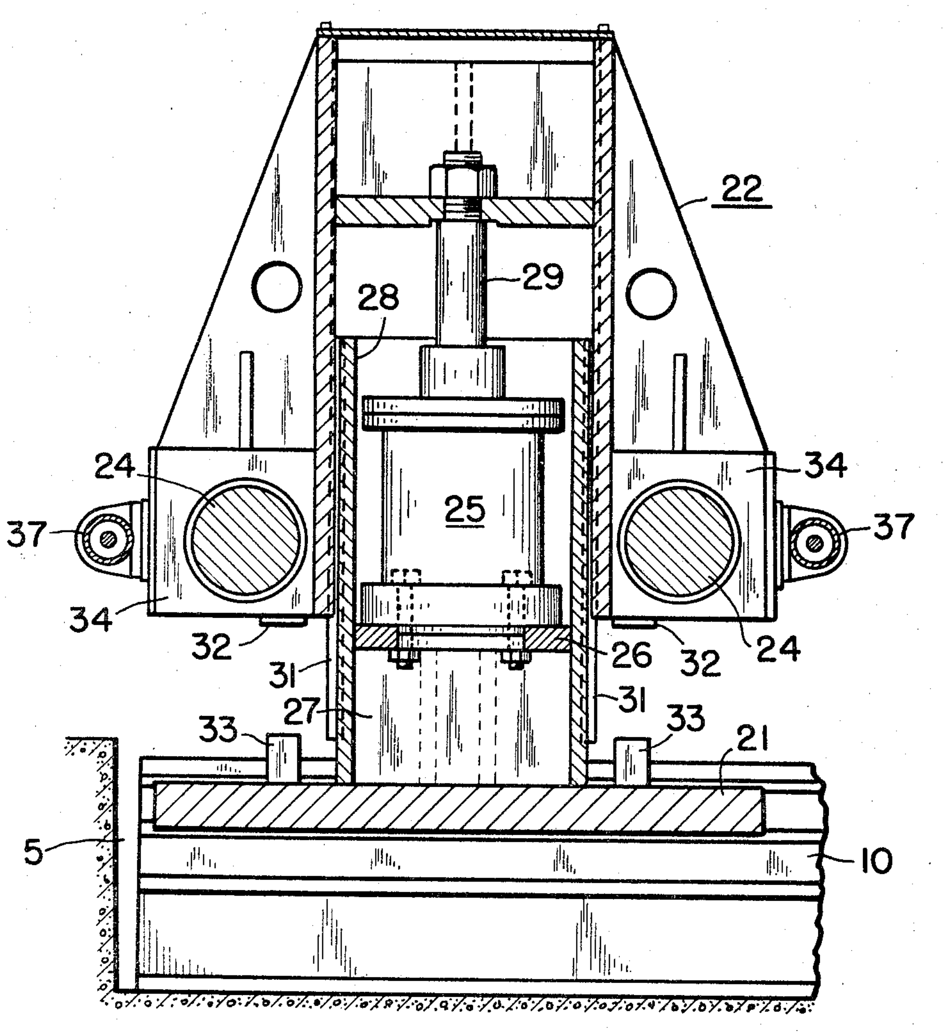
FIG. 5 is a partial section on V—V of FIG. 3 with fingers in the elevated position.

The coil shifting buggy consists of a horizontal base plate 21 and a vertically movable housing 22. The base plate 21 has extensions 23 formed on its opposed edges, and these extensions slide within grooves 13 formed in ways 10 as shown in FIG. 3 when the coil shifting buggy is moved along the ways. The interlocking extensions 23 and grooves 13 are necessary since the lifting of a heavy coil on the extended fingers 24 creates an overturning moment on the buggy, and this moment is offset by means of the interlocked extensions and grooves since the ways are attached to the floor. A hydraulic lift cylinder 25 is bolted to a horizontal plate 26 which is welded to legs 27 and to the guide box 28 which is welded to base plate 21. A piston rod 29 extends upwardly from cylinder 25 and the housing 22 is carried by the piston rod for movement in a vertical direction upon actuation of the cylinder. The mounting arrangement for the cylinder and upper housing is shown in FIG. 5. The housing 22 is guided as it moves vertically by guide member or box 28 extending upwardly from base plate 21. The exterior of the guide box is provided with a plurality of strips 31 which contact the interior of the housing 22 when it overlies the guide box. A contact member 32 is provided on each lug 34, and a stop block 33 is attached to base plate 21 in alignment wtih each contact member. When the housing 22 is in its lowered position, it is supported by the contact members 32 resting on stop blocks 33 as shown in FIGS. 3 and 4.

Each retractable finger 24 is supported in a pair of lugs 34 extending outwardly from opposite sides of the housing 22. The lugs are located adjacent the forward and rear ends of the housing, and each lug carries a bronze bushing to facilitate sliding movement of the fingers. The rear ends of the fingers are attached by a cross link 35 to insure simultaneous movement of the fingers in a direction normal to the path of movement of buggy 20. The cross link is also attached to piston rods 36 of hydraulic cylinders 37. The cylinders 37 are carried by lugs 34 exteriorly of fingers 24 and are located in parallel relation with the fingers. The forward portion of each finger is formed with a flat surface 24′ which is located at an angle for contact with the lower curved portion of a coil which is to be lifted by the fingers.

While the rear ends of the fingers and the two piston rods 36 are disclosed as connected to cross link 35, it should be understood that the fingers may be retracted with equal facility by means of a single hydraulic cylinder and piston rod operating upon the cross link at its center. Also, synchronization gearing may be utilized between the two cylinders 37 to insure simultaneous movement of the rods 36; and in this case, the rods may be attached directly to the corresponding finger without the necessity of a cross link.

Locking limit switches, not shown, are provided at the termination point of each motion to insure that the proper sequence of operation is followed. Additionally, limit switches prevent retraction of the fingers when a coil is carried thereon. The switches are incorporated into the buggy to insure that the buggy will not move with the fingers extended when the housing is in the lowered position and to insure that the fingers will not retract while carrying a coil since retraction at this time would force the coil off the fingers and damage the coil and adjacent equipment. The limit switches are interlocked with the actuating mechanism for hydraulic cylinders.

The following sequence of operation of my forked coil shifting buggy is described in connection with the tail puller and conveyer shown in FIGS. 1, 1A and 1B, but it is to be understood that my coil shifting buggy is not limited to use in this environment. After a coil is moved into position on buggy B and a tail is pulled on the coil by tail puller P, the coil is ready for movement onto the conveyer 3. The housing 22 is in its lowered position, and it is raised until the fingers are properly aligned with the lower surface of the coil. The hydraulic cylinders 37 are then actuated and the piston rods 36 move the fingers 24 forward until the flat surfaces 24′ lie beneath the coil. The fingers are spaced sufficiently far apart, as shown in FIG. 1A, so that they will contact the periphery of the coil outwardly of support members 1 on buggy B. When the fingers are in position, the hydraulic lift cylinder 25 is actuated to raise housing 22 and thereby bring surfaces 24′ into contact with the coil. After the fingers contact the coil, vertical movement of the housing is continued until the coil is raised a sufficient distance to clear the supports 1 on the buggy B and the pallets 4 on the conveyor at which point the coil is in the position shown in FIG. 1B. The amount of vertical displacement necessary to clear the supports and the pallets will depend upon the diameter of the coil and the height of the supports and pallets. It has been found that hydraulic lift cylinder 25 should have a minimum stroke of 10″ to insure clearance. When vertical movement of the fingers is completed, hydraulic cylinder 11 is actuated and piston rod 12 is retracted to move coil shifting buggy 20 into position adjacent conveyer 3. The pallets 4 at the right-hand end of the conveyer as viewed in FIG. 1 will be empty; and when the coil shifting buggy arrives at a position opposite to this pair of pallets, the coil is properly positioned as shown in FIG. 1B and can be lowered onto the pallets. The lowering of the coil is effected by hydraulic lift cylinder 25 which is deactivated to lower housing 22 and the fingers carrying the coil. The fingers are spaced sufficiently far apart so that they contact the lower surface of the coil exteriorly of the pallets 4 on the conveyer 3. After the coil is set on the pallets, the fingers are retracted by hydraulic cylinders 37; and the coil shifting buggy is returned to the starting position shown in FIG. 1.

The coil shifting buggy of my invention has considerable flexibility while requiring a minimum of space for installation. The buggy can move heavy coils without damage to the coils and can be manufactured and maintained at a minimum of cost to the user. Due to the compactness of the buggy, it may be installed in conjunction with existing processing facilities with a minimum of construction.

I claim:

1. Apparatus for moving a coil including spaced longitudinally extending ways, a horizontal base plate located between said ways and having extensions cooperating with said ways, means for moving said base plate longitudinally along said ways, guide means extending upwardly from said base plate, a vertically movable housing overlying said guide means and in slidable engagement therewith, means for raising and lowering said housing attached between said housing and said guide means, a horizontally movable finger located on each side of said housing and means for extending and retracting said fingers relative to said housing, whereby a coil resting on said fingers can be raised and shifted from one location to another.

2. Apparatus as set forth in claim 1 wherein said ways are formed with longitudinal grooves and said base plate extensions ride in said grooves, whereby said extensions and grooves cooperate to resist overturning of said housing when a coil is supported on said fingers in the extended position.

3. Apparatus as set forth in claim 1 wherein said guide means includes a plurality of contact strips on its exterior surface, said strips engaging the interior of said housing when said housing slides vertically relative to said guide means.

4. Apparatus as set forth in claim 1 including a plurality of contact members attached at the bottom of said housing and stop members located on said base plate and aligned with said contact members whereby said contact members rest on said stop members when said housing is in its lowermost position.

5. Apparatus as set forth in claim 1 wherein the inner end of each of said fingers is formed with a flat surface, said flat surfaces facing upwardly and inwardly for contact with the bottom surface of a coil to be moved.

6. Apparatus as set forth in claim 1 including a cross link connecting the outer ends of said fingers and wherein said means for extending and retracting said fingers is hydraulic cylinders and piston rods, said hydraulic cylinders being mounted on opposite sides of said housing adjacent said fingers and said piston rods extending between the outer end of each of said fingers and the corresponding cylinder, whereby simultaneous movement of said fingers is caused by movement of said piston rods.

7. Apparatus as set forth in claim 1 wherein said means for raising and lowering said housing is a hydraulic cylinder and a piston rod, said piston rod extending upwardly from said cylinder and connected to said housing.

8. Apparatus as set forth in claim 1 wherein said means for moving said base plate along said ways is a hydraulic cylinder and a piston rod, said piston rod extending from said cylinder and connected to said base plate whereby longitudinal movement of said piston rod moves said base plate along said ways.

References Cited

UNITED STATES PATENTS

| | | | |
|---|---|---|---|
| 2,444,055 | 6/1948 | McAulay | 214—15 X |
| 2,483,894 | 10/1949 | Feibel | 187—9 |
| 2,581,364 | 1/1952 | Cushman. | |
| 2,647,647 | 8/1953 | Alimanestiano. | |
| 2,985,328 | 5/1961 | Fitch | 214—731 |

FOREIGN PATENTS

| | | |
|---|---|---|
| 631,733 | 11/1961 | Canada. |

GERALD M. FORLENZA, *Primary Examiner.*

FRANK E. WERNER, *Assistant Examiner.*

U.S. Cl. X.R.

214—89, 670, 38